(12) United States Patent
Guchhait et al.

(10) Patent No.: US 12,093,714 B2
(45) Date of Patent: Sep. 17, 2024

(54) SYSTEM AND METHOD FOR ESTIMATION OF PERFORMANCE IMPACT UPON A HYPERVISOR IN A CLOUD ENVIRONMENT

(71) Applicant: ORACLE INTERNATIONAL CORPORATION, Redwood Shores, CA (US)

(72) Inventors: Achintya Guchhait, Bengaluru (IN); Adithya Shreedhar, Bengaluru (IN); Sriram Gummuluru, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 395 days.

(21) Appl. No.: 17/380,750

(22) Filed: Jul. 20, 2021

(65) Prior Publication Data
US 2023/0031963 A1 Feb. 2, 2023

(51) Int. Cl.
*G06F 9/455* (2018.01)
*G06F 9/48* (2006.01)
(Continued)

(52) U.S. Cl.
CPC .......... *G06F 9/45558* (2013.01); *G06F 9/455* (2013.01); *G06F 9/48* (2013.01);
(Continued)

(58) Field of Classification Search
CPC .................. G06F 9/455; G06F 9/45558; G06F 2009/4557; G06F 2009/45583;
(Continued)

(56) References Cited

U.S. PATENT DOCUMENTS

2015/0236971 A1 8/2015 Sesha et al.
2015/0350055 A1* 12/2015 Hyser ................ G06F 9/45558
709/224

(Continued)

OTHER PUBLICATIONS

Huynh, "Finding Noisy Neighbours and Quantifying Performance Impact", Proceedings of the 2020 OMI Seminars Research Trends in Data Centre Operations, Selected Topics in Data Centre Operations, and Research Trends in the Internet of Things (PROMIS 2020). pp. 1-14 (Year: 2020).*

(Continued)

*Primary Examiner* — Charles M Swift
(74) *Attorney, Agent, or Firm* — TUCKER ELLIS LLP

(57) ABSTRACT

In accordance with an embodiment, described herein is a system and method for use with a cloud computing environment, for estimation of performance impact upon a hypervisor provided within such environments, and the use of such estimation in placing virtual machines within the environment. A noisy-neighbor score value, generated for a particular hypervisor socket on a multi-core processor architecture, provides a predicted measure of performance drop which affected virtual machines placed on that hypervisor socket may experience at a particular point in time, due to activity of neighboring virtual machines on one or more sockets of the hypervisor. The predicted measure of performance drop can be automatically calculated by the system based on the amount and nature of compute usage on the hypervisor, and data defining a machine learning model developed from or through the operation and assessment of controlled noisy-neighbor studies over a collection of compute and memory-intensive workloads.

20 Claims, 14 Drawing Sheets

(51) Int. Cl.
*G06F 9/50* (2006.01)
*G06F 11/34* (2006.01)
*G06N 20/00* (2019.01)

(52) U.S. Cl.
CPC .............. *G06F 9/50* (2013.01); *G06F 9/5072* (2013.01); *G06F 9/5077* (2013.01); *G06F 9/5083* (2013.01); *G06F 9/5088* (2013.01); *G06F 11/3409* (2013.01); *G06F 11/3447* (2013.01); *G06N 20/00* (2019.01); *G06F 2009/4557* (2013.01); *G06F 2009/45583* (2013.01); *G06F 2009/45591* (2013.01)

(58) Field of Classification Search
CPC .... G06F 2009/48891; G06F 9/48; G06F 9/50; G06F 9/5072; G06F 9/5077; G06F 9/5083; G06F 9/5088; G06F 11/301; G06F 11/3409; G06F 11/3447; G06F 11/3466; G06N 20/00
See application file for complete search history.

(56) References Cited

U.S. PATENT DOCUMENTS

| | | | |
|---|---|---|---|
| 2018/0241811 A1 | 8/2018 | Chen et al. | |
| 2019/0354388 A1 | 11/2019 | Mitra et al. | |
| 2020/0371857 A1 | 11/2020 | Guha et al. | |
| 2021/0397467 A1* | 12/2021 | Pascual | H04L 69/162 |
| 2022/0385542 A1* | 12/2022 | Gokan Khan | H04L 41/40 |

OTHER PUBLICATIONS

Akundi et al, "Suppressing Noisy Neighbours in 5G networks An end-to-end NFV-based framework to detect and suppress noisy neighbours", ICDCN 2020, Jan. 4-7, 2020, Kolkata, India, ACM, pp. 1-6. (Year: 2020).*
Bouattour, et al., "Root Cause Analysis of Noisy Neighbors in a Virtualized Infrastructure", https://hal.archives-ouvertes.fr/hal-02572018, submitted May 13, 2020, retrieved from https://hal.archives-ouvertes.fr/hal-02572018/document, 7 pages.
Lorido-Botran, et al., "An unsupervised approach to online noisy-neighbor detection in cloud data centers", Expert Systems with Applications, vol. 89, Dec. 15, 2017, retrieved from https://www.sciencedirect.com/science/article/abs/pii/S0957417417305158 on Jul. 20, 2021, 3 pages.
Margolin, et al., "Using Machine Learning to Detect Noisy Neighbors in 5G Networks", submitted Oct. 24, 2016, retrieved from https://arxiv.org/pdf/1610.07419.pdf, 4 pages.
Mozo, et al., "Scalable Prediction of Service-Level Events in Datacenter Infrastructure Using Deep Neural Networks", published Nov. 27, 2019 on IEEE Access, retrieved from https://ieeexplore.ieee.org/stamp/stamp.jsp?arnumber=8915840, 20 pages.
Ordozgoiti, et al., "Deep convolutional neural networks for detecting noisy neighbours in cloud infrastructure", European Symposium on Artificial Neural Networks, Computational Intelligence and Machine Learning, Apr. 2017, retrieved from https://www.elen.ucl.ac.be/Proceedings/esann/esannpdf/es2017-102.pdf, 6 pages.
Rostykus, et al., "Predictive CPU isolation of containers at Netflix", Netflix Technology Blog, published Jun. 4, 2019, retrieved from https://netflixtechblog.com/predictive-cpu-isolation-of-containers-at-netflix-91f014d856c7 on Jul. 20, 2021, 10 pages.

* cited by examiner

SYSTEM AND METHOD FOR ESTIMATION OF PERFORMANCE IMPACT UPON A HYPERVISOR IN A CLOUD ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally directed to cloud computing environments, and are particularly directed to systems and methods for estimation of performance impact upon a hypervisor socket provided within such environments, and the use of such estimation in placing virtual machines within the environment.

BACKGROUND

In a cloud computing environment (cloud environment), the system can include various hardware and software resources, and a hypervisor that provides virtualization of system resources through the use of virtual machines. Such virtualization enables the system to run multiple virtual machines that are generally isolated from each other, and which can then be used by tenants of the environment to run their particular applications.

However, in such environments a commonly-encountered issue is the so-called "noisy-neighbor" problem, whereby a particular tenant of the cloud environment, or a particular virtual machine being used by that tenant, uses a substantial amount of the system resources, such as, for example, processor, disk input/output, or bandwidth, to the potential detriment of one or more other tenants who as a result obtain lesser performance.

SUMMARY

In accordance with an embodiment, described herein is a system and method for use with a cloud computing environment, for estimation of performance impact upon a hypervisor provided within such environments, and the use of such estimation in placing virtual machines within the environment. A noisy-neighbor score value, generated for a particular hypervisor socket on a multi-core processor architecture, provides a predicted measure of performance drop which affected virtual machines placed on that hypervisor socket may experience at a particular point in time, due to activity of neighboring virtual machines on one or more sockets of the hypervisor. The predicted measure of performance drop can be automatically calculated by the system based on the amount and nature of compute usage on the hypervisor, and data defining a machine learning model developed from or through the operation and assessment of controlled noisy-neighbor studies over a collection of compute and memory-intensive workloads.

DETAILED DESCRIPTION

In a cloud computing environment (cloud environment) that includes a hypervisor that provides virtualization of system resources through the use of virtual machines, for use by tenants of the environment to run their particular applications; a commonly-encountered issue is the so-called "noisy-neighbor" problem, whereby a particular tenant of the cloud environment, or a particular virtual machine being used by that tenant, uses a substantial amount of system resources, such as, for example, processor, disk input/output, or bandwidth, to the potential detriment of one or more other tenants who as a result obtain lesser performance.

In accordance with an embodiment, described herein is a system and method for use with a cloud computing environment, for estimation of performance impact upon a hypervisor provided within such environments, and the use of such estimation in placing virtual machines within the environment.

A noisy-neighbor score value, generated for a particular hypervisor socket on a multi-core processor architecture, provides a predicted measure of performance drop which affected virtual machines placed on that hypervisor socket may experience at a particular point in time, due to activity of neighboring virtual machines on one or more sockets of the hypervisor. The predicted measure of performance drop can be automatically calculated by the system based on the amount and nature of compute usage on the hypervisor, and data defining a machine learning model developed from or through the operation and assessment of controlled noisy-neighbor studies over a collection of compute and memory-intensive workloads.

In accordance with an embodiment, the predicted measure of performance drop or noisy-neighbor score can then be used for various purposes, for example to determine the deployment or placement of virtual machines within the cloud environment, to better facilitate sharing of resources or improve system performance for one or more tenants.

Cloud Computing Environments

Figure 1:
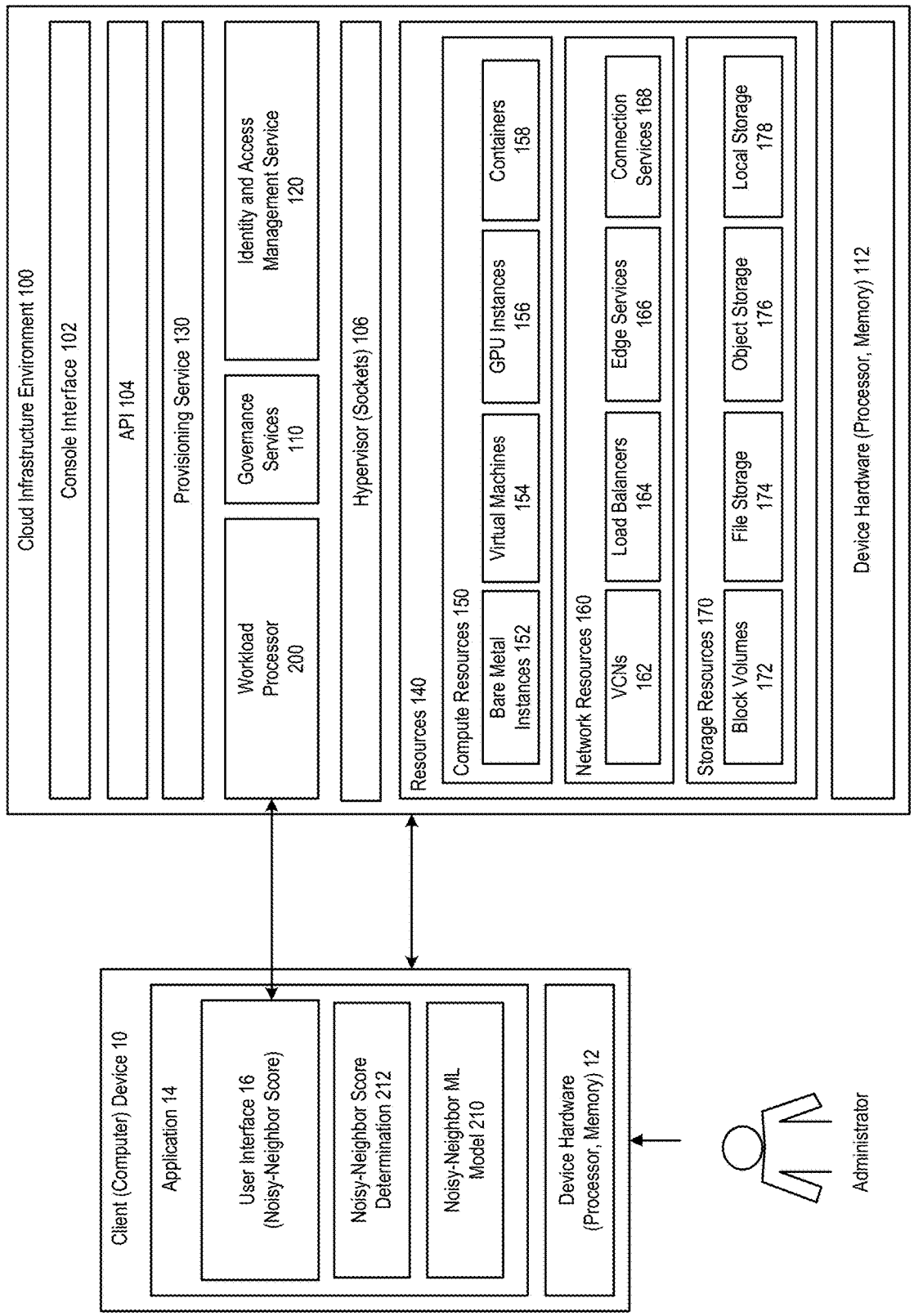
FIG. 1 illustrates an example cloud computing environment, in accordance with an embodiment.

FIG. 1 illustrates an example cloud computing environment, in accordance with an embodiment.

In accordance with an embodiment, the cloud computing environment (cloud environment) illustrated in FIG. 1 is provided for purposes of illustrating an example of one type of cloud environment that can utilize the systems and methods described herein for automating heterogeneous diagnostic data analysis and expertise. In accordance with other embodiments and examples, the systems and methods described herein can also be used with other types of cloud environments, cloud services, cloud computing, or other computing environments.

In accordance with an embodiment, the components and processes illustrated in FIG. 1, and as further described herein with regard to various other embodiments, can be provided as software or program code executable by a computer system or other type of processing device. For example, in accordance with an embodiment, the components and processes described herein can be provided by a cloud computing system, or other suitably-programmed computer system.

In accordance with an embodiment, a cloud infrastructure environment 100, which can be run on a number of hardware and software resources 112, can comprise a console interface 102, API 104, and hypervisor 106.

In addition, the cloud infrastructure environment 100 can support a number of governance services 110, an identity and access management (IAM) service 120, and a provisioning service 130. The cloud infrastructure environment 100 can also support a number of resources 140, e.g., in layers, such as a computer resource layer 150, a network resource layer 160, and a storage resource layer 170. In accordance with an embodiment, a client device, such as a computing device 10 having device hardware (processor, memory . . . etc.) 12, can communicate with the cloud infrastructure environment via a network, such as a wide area network (WAN), a local area network (LAN), or the internet, for example. The client device can comprise an application 14, which can comprise a user interface 16, and as described below can be used to determine and display a noisy-neighbor score of a socket of a hypervisor provided within the environment.

In accordance with an embodiment, within the cloud infrastructure environment, tenancy can be supported. On registration and deployment, a tenancy can be created for each client/customer, which can comprise a secure and isolated partition within the cloud infrastructure in which the client can create, organize, and administer their cloud resources.

In accordance with an embodiment, the console interface 102 and the API 104 can provide clients with access to, and control over respective portions of the could infrastructure environment. In accordance with an embodiment, the console interface can comprise an intuitive, graphical interface that lets clients create and manage resources, instances, cloud networks, and storage volumes, as well as manage users associated with the client, and set permissions within the client scope. As well, the API 104 can compromise, for example, a REST API that utilizes HTTPS (hypertext transfer protocol secure).

In accordance with an embodiment, one example of a console interface or API can be a configuration management tool (e.g., Ansible). The configuration management tool can be used for cloud infrastructure provisioning, orchestration, and configuration management. Configuration management tools can allow clients to automate configuring and provisioning of the cloud infrastructure, deploying and updating software assets, and orchestrating complex operational processes.

In accordance with an embodiment, the governance services 110 of the cloud infrastructure environment provides clients tools to help clients enable simple resource governance, manage costs, and control access to the cloud infrastructure. As an example, the governance services provide for tagging which can allow for clients to apply tags to their resources for informational or operational reasons.

In accordance with an embodiment, the identity and access management (IAM) service 120 can create a user profile for each client/customer/user in the IAM service with associated with user credential (e.g., username and password). Clients can be granted administrator privileges in the cloud infrastructure as well via the IAM service.

In accordance with an embodiment, the identity and access management service can be integrated with the cloud infrastructure environment. Upon a client registering. The IAM service can create a separate user credential in an identity service, which can then allow for single sign on to the cloud infrastructure service as well as access to additional cloud services.

In accordance with an embodiment, the provisioning service 130 can provision, for example, a tenancy within cloud infrastructure service, such as within the resources 140. The provisioning service can be accessed and controlled through, for example, the console interface or via one or more APIs, such as API 104. The provisioning service can allow for clients to provision and manage compute hosts, which can be referred to as instances. Clients can launch instances as needed to meet compute and application requirements. After a client launches an instance, the provisioned instance can be accessed from, for example, a client device. The provisioning service can also provide for restarting an instance, attaching and detaching volumes from an instance, and terminating an instance.

In accordance with an embodiment, resources 140 provided by a cloud infrastructure environment can be broken down into a plurality of layers, such as a compute resources layer 150, a network resources layer 160, and a storage resource layer 170.

In accordance with an embodiment, the compute resources layer 150 can comprise a number of resources, such as, for example, bare metal instances 152, virtual machines 154, edge services 156, and containers 158. The compute resources layer can be used to, for example, provision and manage bare metal compute instances, provision instances as needed to deploy and run applications, just as in an on-premises data center. In accordance with an embodiment, the cloud infrastructure environment can provide control of one or more physical host ("bare metal") machines within the compute resources layer. Bare metal compute instances run directly on bare metal servers without a hypervisor. When a bare metal compute instance is provisioned, the client can maintain sole control of the physical CPU, memory, and network interface card (NIC). The bare metal compute instance can be configured and utilize the full capabilities of each physical machine as if it were hardware running in an on-premise own data center. As such, bare metal compute instances are generally not shared between tenants.

In accordance with an embodiment, bare metal compute instances can provide, via the associated physical hardware as opposed to a software-based virtual environment, a high level of security and performance.

In accordance with an embodiment, the cloud infrastructure environment can provide control of a number of virtual machines within the compute resources layer. A virtual machine compute host can be launched, for example, from an image that can determine the virtual machines operation system as well as other software. The types and quantities of resources available to a virtual machine instance can be determined, for example, based upon the image that the virtual machine was launched from.

In accordance with an embodiment, a virtual machine (VM) compute instance can comprise an independent computing environment that runs on top of physical bare metal hardware. The virtualization makes it possible to run multiple VMs that are isolated from each other. VMs can be used, for example, for running applications that do not require the performance and resources (CPU, memory, network bandwidth, storage) of an entire physical machine.

In some embodiments, virtual machine instances can run on the same hardware as a bare metal instance, which can provide leverage over using the same cloud-optimized hardware, firmware, software stack, and networking infrastructure.

In accordance with an embodiment, the cloud infrastructure environment can provide a number of graphical processing unit (GPU) compute instances within the compute resources layer. Accelerated computing requires consistently-fast infrastructure across every service. With GPU instances, clients can process and analyze massive data sets more efficiently, making them useful for complex machine learning (ML), artificial intelligence (AI) algorithms, and many industrial high-performance computing (HPC) applications. GPU compute instances can be provisioned as either virtualized compute instances (where multiple GPU compute instances share the same bare metal hardware), or as bare metal instances which provide dedicate hardware for each GPU compute instance.

In accordance with an embodiment, the cloud infrastructure environment can provide a number of containerized compute instances within the compute resources layer. A standalone container engine service can be used to build and launch containerized applications to the cloud. The container service can be used, for example, to build, deploy, and manage cloud-native applications. The container service can specify the compute resources that the containerized applications require, and the container engine can then provision, via the provisioning service, the required compute resources for use within the cloud infrastructure environment (e.g., in the context of a tenancy).

In accordance with an embodiment, one such container service engine that can be used is Kubernetes, an open-source system for automating deployment, scaling, and management of containerized applications across clusters of hosts. Such container services can group the containers that make up an application into logical units for easy management and discovery.

In accordance with an embodiment, the network resources layer 160 can comprise a number of resources, such as, for example, virtual cloud networks (VCNs) 162, load balancers 164, edge services 166, and connection services 168.

In accordance with an embodiment, the cloud infrastructure environment can provide a number of virtual cloud networks 162 at the networking resources layer. A virtual cloud network can comprise a virtual version of a traditional network including subnets, route tables, and gateways on which client instances can run. A cloud network resides within a single region but includes all the region's availability domains. Each subnet defined in the cloud network can either be in a single availability domain or span all the availability domains in the region (recommended). At least one cloud network can be configured before launching instances. In certain embodiments, VCNs can be configured via an internet gateway to handle public traffic, a VPN connection, or a fast connect service to securely extend on-premises network.

In accordance with an embodiment, the cloud infrastructure environment can provide a number of load balancers 164 at the networking resources layer. A load balancing service can provide automated traffic distribution from one entry point to multiple servers reachable from a virtual cloud network (VCN). Various load balancers can provide a public or private IP address, and provisioned bandwidth.

In accordance with an embodiment, a load balancer can improve resource utilization, scaling, and help ensure high availability. Multiple load balancing policies can be configured, and application-specific health checks can be provided to ensure that the load balancer directs traffic only to healthy instances. The load balancer can reduce maintenance window by draining traffic from an unhealthy application server before it is removed from service for maintenance.

In accordance with an embodiment, a load balancing service enables creation of a public or private load balancer in conjunction with a VCN. A public load balancer has a public IP address that is accessible from the internet. A private load balancer has an IP address from the hosting subnet, which is visible only within the VCN. Multiple listeners can be configured for an IP address to load balance transport different layers of traffic (e.g., Layer 4 and Layer 7 (TCP and HTTP) traffic). Both public and private load balancers can route data traffic to any backend server that is reachable from the VCN.

In accordance with an embodiment, a public load balancer can accept traffic from the internet, a public load balance can be created that is assigned a public address, which serves as the entry point for incoming traffic.

In accordance with an embodiment, a public load balancer is regional in scope. If a region includes multiple availability domains, a public load balancer can have, for example, a regional subnet, or two availability domain-specific (AD-specific) subnets, each in a separate availability domain. With a regional subnet, the load balancer can create a primary load balancer and a standby load balancer, each in a different availability domain, to ensure accessibility even during an availability domain outage. If a load balance is created in multiple AD-specific subnets, one subnet can host the primary load balancer and the other hosts a standby load balancer. If the primary load balancer fails, the public IP address can switch to the secondary load balancer. The service treats the two load balancers as equivalent.

In accordance with an embodiment, if a region includes only one availability domain, the service requires just one subnet, either regional or AD-specific, to host both the primary and standby load balancers. The primary and standby load balancers can each have a private IP address from the host subnet, in addition to the assigned floating public IP address. If there is an availability domain outage, the load balancer has no failover.

In accordance with an embodiment, private load balancers can also be provided so as to isolate the load balancer from the internet and simplify security posture. The load balancer service can assign a private address to the load balancer that serves as the entry point for incoming traffic.

In accordance with an embodiment, a private load balancer can be created by a service to service only one subnet to host both the primary and standby load balancers. The load balancer can be regional or AD-specific, depending on the scope of the host subnet. The load balancer is accessible only from within the VCN that contains the host subnet, or as further restricted by security rules.

In accordance with an embodiment, the assigned floating private IP address is local to the host subnet. The primary and standby load balancers each require an extra private IP address from the host subnet.

In accordance with an embodiment, if there is an availability domain outage, a private load balancer created in a regional subnet within a multi-AD region provides failover capability. A private load balancer created in an AD-specific subnet, or in a regional subnet within a single availability domain region, has no failover capability in response to an availability domain outage.

In accordance with an embodiment, the cloud infrastructure environment can provide a number of edge services 166 at the networking resources layer. In general, edge services comprise a number of services that allow clients to manage, secure, and maintain domains and endpoints. These include, for example, DNS (domain name system), DDoS (distributed denial of service) protection, and email delivery. These services enable clients to optimize performance, thwart cyberattacks, and scale communication.

In accordance with an embodiment, the cloud infrastructure environment can provide a number of connection services 168 at the networking resources layer. Such connection services can provide an easy way to create a dedicated, private connection between a client data center or existing network and the cloud infrastructure environment. The connection service can provide high bandwidth, and a reliable and consistent network.

In accordance with an embodiment, the storage resources layer 170 can comprise a number of resources, such as, for example, block volumes 172, file storage 174, object storage 176, and local storage 178.

In accordance with an embodiment, block volumes 172 provide high-performance network storage capacity that supports a broad range of I/O intensive workloads. Clients can use block volumes to expand the storage capacity of compute instances, to provide durable and persistent data storage that can be migrated across compute instances, and to host large databases.

In accordance with an embodiment, file storage 174 allows clients to create a scalable, distributed, enterprise-grade network file system. File storage supports semantics, snapshots capabilities, and data at-rest encryption.

In accordance with an embodiment, object storage provides high throughput storage for unstructured data. Object storage service enables near limitless storage capacity for large amounts of analytic data, or rich content like images and videos. Block volumes can be backed up to object storage for added durability.

In accordance with an embodiment, local storage 178 can provide, for example, high speed and reliable storage in the form of solid state drives for I/O intensive applications. These can be provided, for example, within bare metal instances. Local storage provides high storage performance for VM's and bare metal compute instances, and can be used, for example with relational databases, data warehousing, big data, analytics, AI, or HPC applications.

Noisy-Neighbor Scores and Estimation of Performance Impact

In a cloud computing environment (cloud environment) that includes a hypervisor that provides virtualization of system resources through the use of virtual machines, for use by tenants of the environment to run their particular applications; a commonly-encountered issue is the so-called "noisy-neighbor" problem, whereby a particular tenant of the cloud environment, or a particular virtual machine being used by that tenant, uses a substantial amount of system resources, such as, for example, processor, disk input/output, or bandwidth, to the potential detriment of one or more other tenants who as a result obtain lesser performance.

In accordance with an embodiment, a system and method are described herein for use with a cloud computing environment, for estimation of performance impact upon a hypervisor socket provided within such environments, and the use of such estimation in placing virtual machines within the environment.

Figure 2:
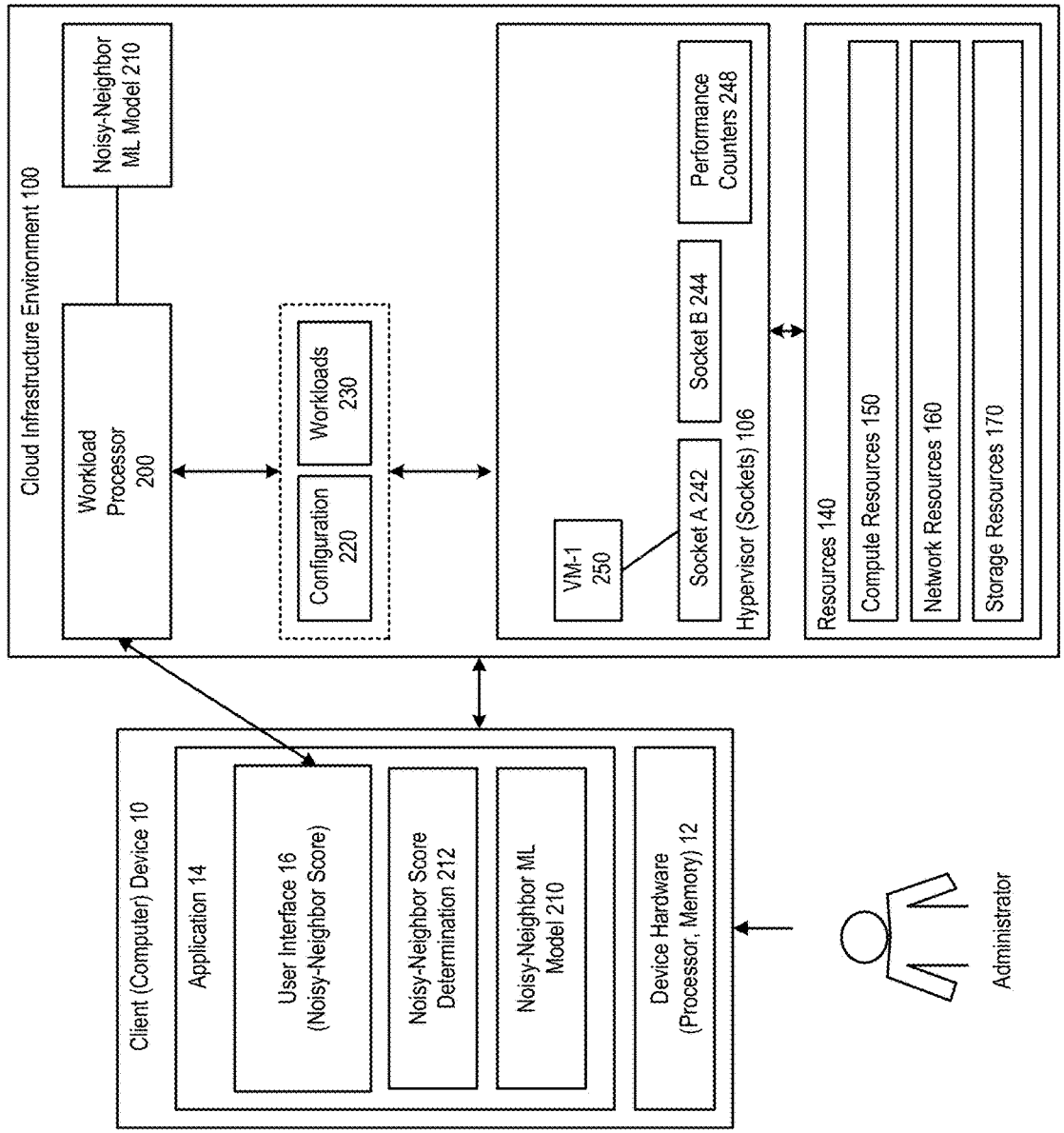
FIG. 2 illustrates a system for estimation of performance impact upon a hypervisor socket provided within a cloud environment, and the use of such estimation in placing virtual machines within the environment, in accordance with an embodiment.

FIG. 2 illustrates a system for estimation of performance impact upon a hypervisor socket provided within a cloud environment, and the use of such estimation in placing virtual machines within the environment, in accordance with an embodiment.

As illustrated in FIG. 2, in accordance with an embodiment, the system can include a workload processor 200 operating within the cloud environment, a machine learning model 210 that is developed from or through the operation and assessment of controlled noisy-neighbor studies over a collection of compute and memory-intensive workloads, and a noisy-neighbor score determination component 212, which operates in combination to generate a noisy-neighbor score.

In accordance with an embodiment, tenant (customer) workloads are typically executed on shared large multi-core machines. Virtual machines running such tenant workloads are placed on compute resources where virtual machines for other tenants are often running on other cores in the shared host. When such virtual machines share hypervisor sockets, a noisy-neighbor sharing a hypervisor socket can affect and degrade performance of virtual machines. For optimal performance, it is desirable to minimize performance degradation due to the noisy-neighbor effect.

In accordance with an embodiment, a noisy-neighbor score value is generated for a particular hypervisor socket on a multi-core processor architecture, and provides a predicted measure of performance drop which virtual machines landing on affected hypervisor socket may experience at a particular point in time, due to activity of neighboring virtual machines on one or more sockets of the hypervisor.

In accordance with an embodiment, the predicted measure of performance drop can be automatically calculated by the system based on the amount and nature of compute usage on the hypervisor, and data defining a machine learning model that is developed from controlled noisy-neighbor studies over a collection of compute and memory-intensive workloads.

In accordance with an embodiment, in order to prepare the machine learning model, a set of virtual machine configurations 220 and workloads 230 are used. The workload processor can receive an indication of a particular configuration of virtual machine and hypervisor for workload testing, to determine a performance drop on the virtual machine based on the amount and nature of compute usage on the hypervisor, as affected by neighboring virtual machines. The overall effect on the hypervisor socket from the collective load of all the VMs placed therein is matched with the closest workload profile of the controlled studies done on the same platform which forms the basis of the machine learning model's knowledge base.

As further illustrated in FIG. 2, in accordance with an embodiment, and for purposes of generating the machine learning model and noisy-neighbor score for a hypervisor socket (Sock-1), a virtual machine (VM-1 250) can be placed in a hypervisor having a plurality of sockets A 242, B 244, and performance counters 248 that measure performance metrics.

Figure 3:
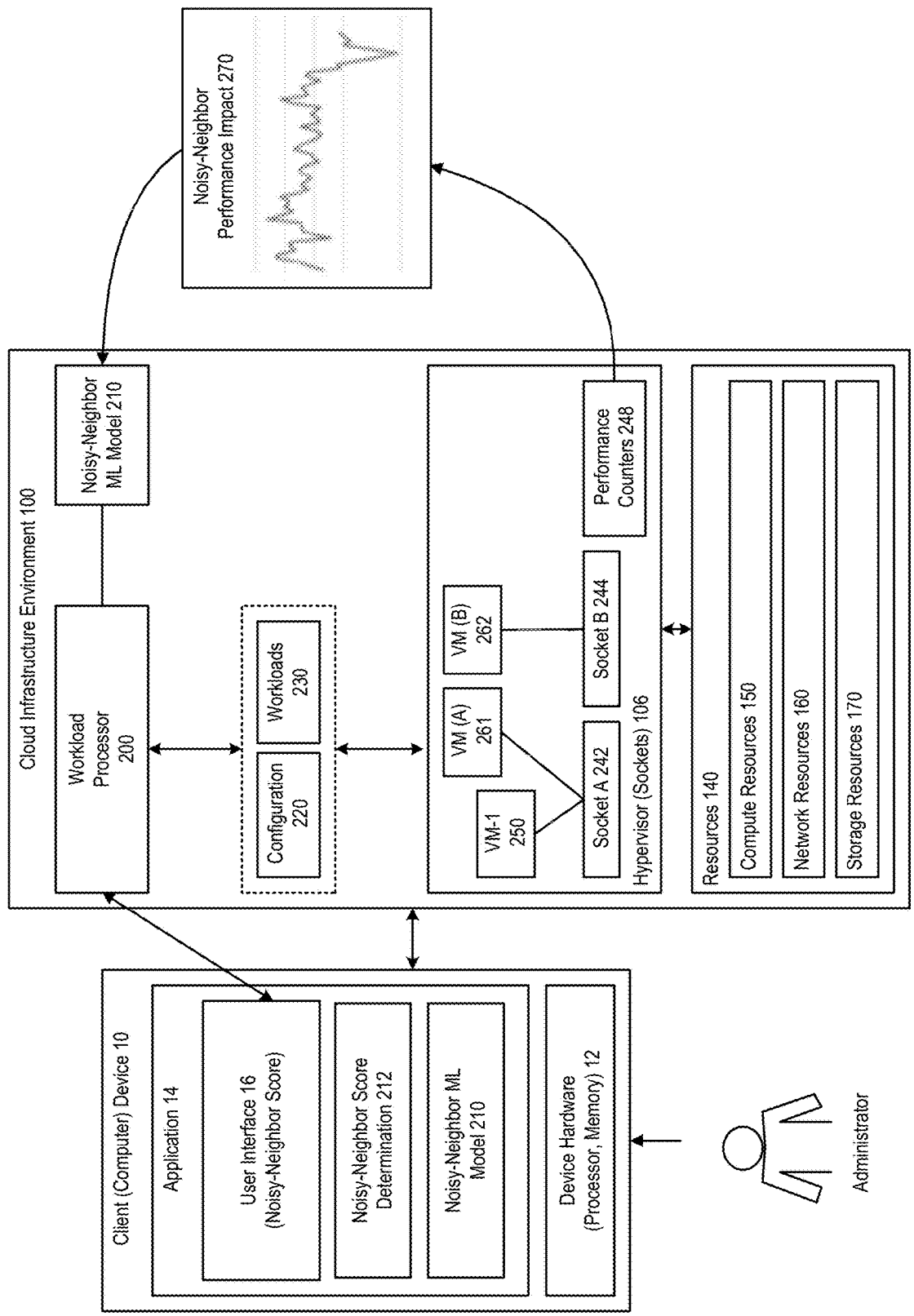
FIG. 3 further illustrates a system for estimation of performance impact upon a hypervisor socket provided within a cloud environment, in accordance with an embodiment.
Figure 4:
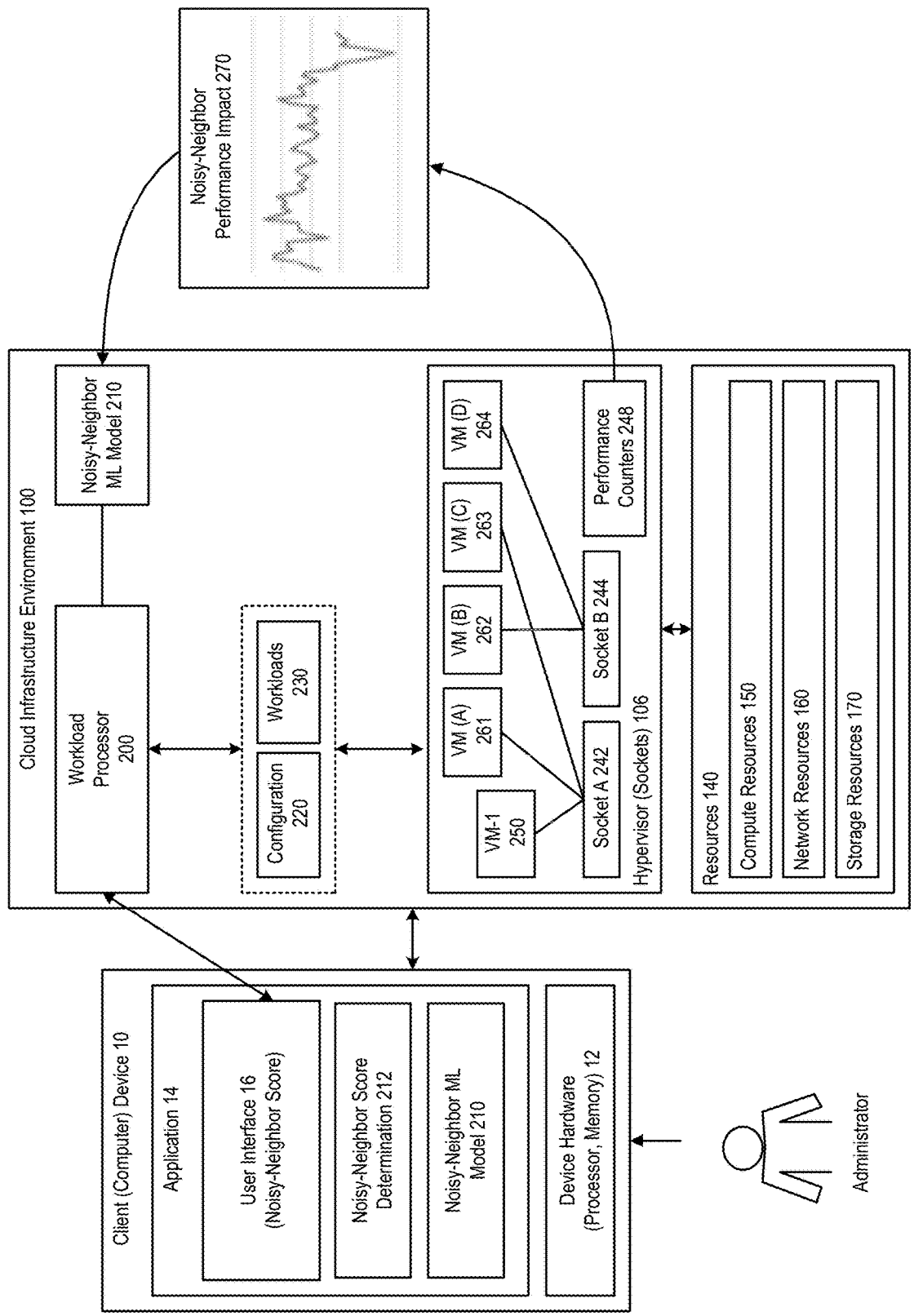
FIG. 4 further illustrates a system for estimation of performance impact upon a hypervisor socket provided within a cloud environment, in accordance with an embodiment.
Figure 5:
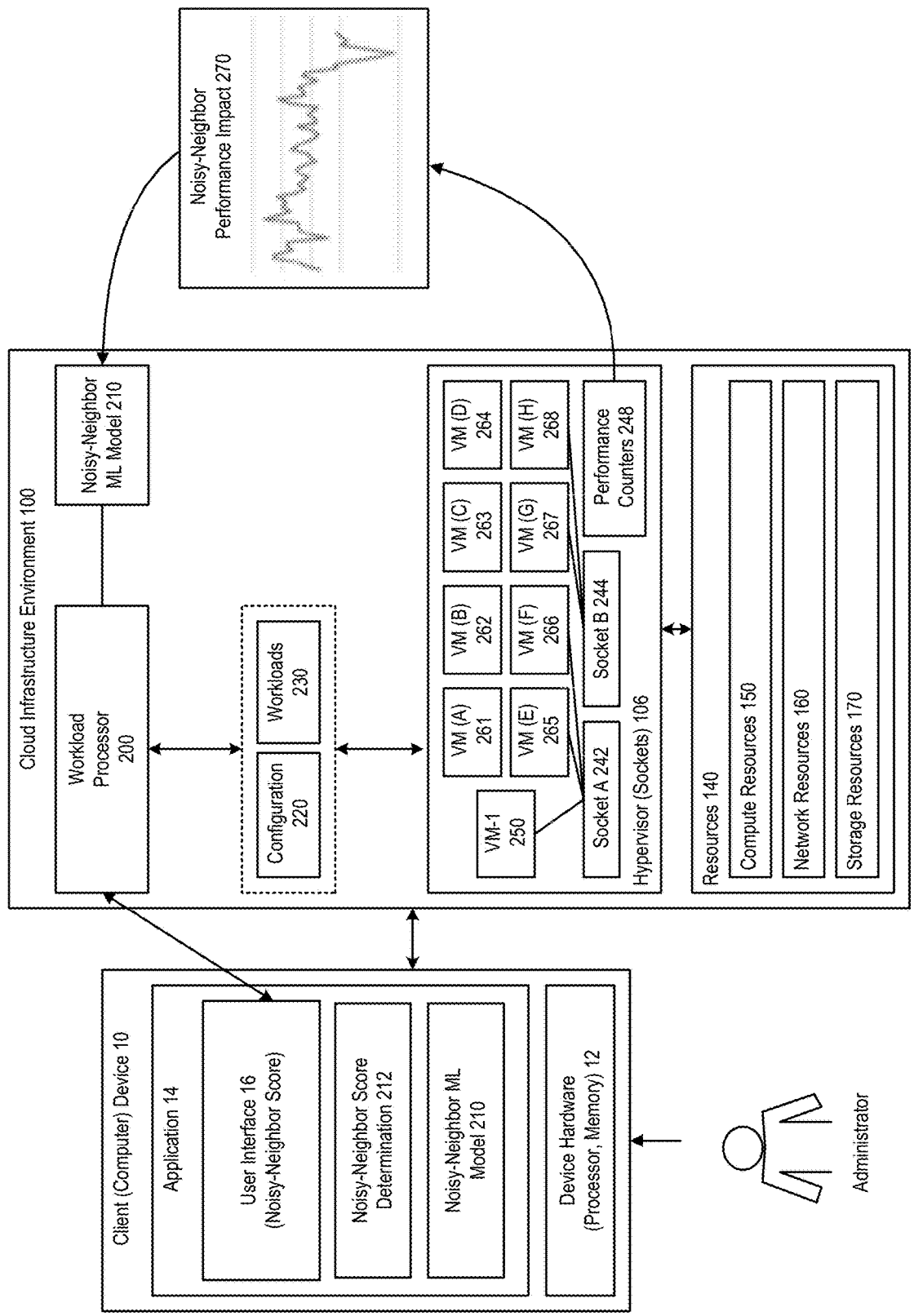
FIG. 5 further illustrates a system for estimation of performance impact upon a hypervisor socket provided within a cloud environment, in accordance with an embodiment.

FIGS. 3-5 further illustrate a system for estimation of performance impact upon a hypervisor socket provided within a cloud environment, in accordance with an embodiment.

As illustrated in FIGS. 3-5, in accordance with an embodiment, the workloads are executed in a controlled environment by running a single virtual machine, for obtaining a baseline indication of performance, and then running the workloads with 2, 4 and 8 virtual machine neighbors (261-268) having the same configuration, and which share one socket of the hypervisor.

Figure 6:
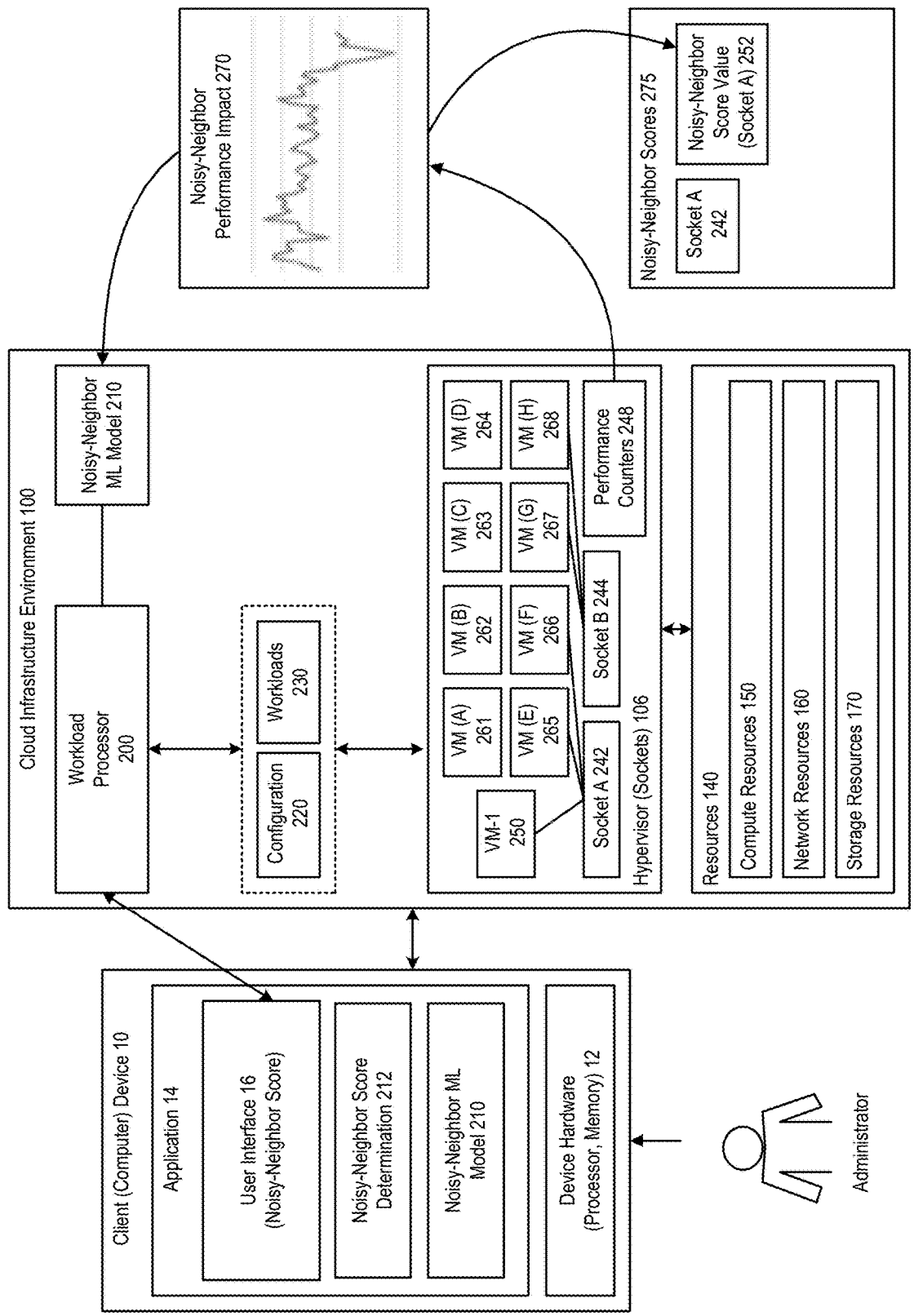
FIG. 6 further illustrates a system for estimation of performance impact upon a hypervisor socket provided within a cloud environment, in accordance with an embodiment.

FIG. 6 further illustrates a system for estimation of performance impact upon a hypervisor socket provided within a cloud environment, in accordance with an embodiment.

As illustrated in FIG. 6, in accordance with an embodiment, during each run, the system enables an analysis of various available counters and choice of an appropriate set of counters to monitor. By collecting data from such counters and monitoring performance degradation, a predictive model is built using machine learning techniques. Since the noisy-neighbor performance impact 270 is hardware socket specific, the system is adapted to generate the noisy-neighbor score for each of a plurality of hypervisor sockets. The score provides a measure or otherwise determines, for example a percentage drop in performance, each of the virtual machines placed on the hypervisor socket will potentially experience, compared to a case when the virtual machine is the only occupant on the hypervisor socket.

For example, in accordance with an embodiment, the hardware counters can be studied to assess the usage profile and noisy-neighbors in a controlled environment, and determine the counters that effectively drive the drop in performance. These identified counter readings are supplied along with the measured drop in performance as data use in the training of the machine learning model, and the generated of noisy-neighbor scores 275. For example, as illustrated in FIG. 6, as a result or output of the process or generating noisy-neighbor scores, each of sockets A 242 and B 244 will be associated with their own individual noisy-neighbor scores 252, 254, respectively.

In accordance with an embodiment, subsequently, for example while placing a new virtual machine on a host, the model can be used to predict potential degradation based on observed metrics from such counters at the time of placement.

Figure 7:
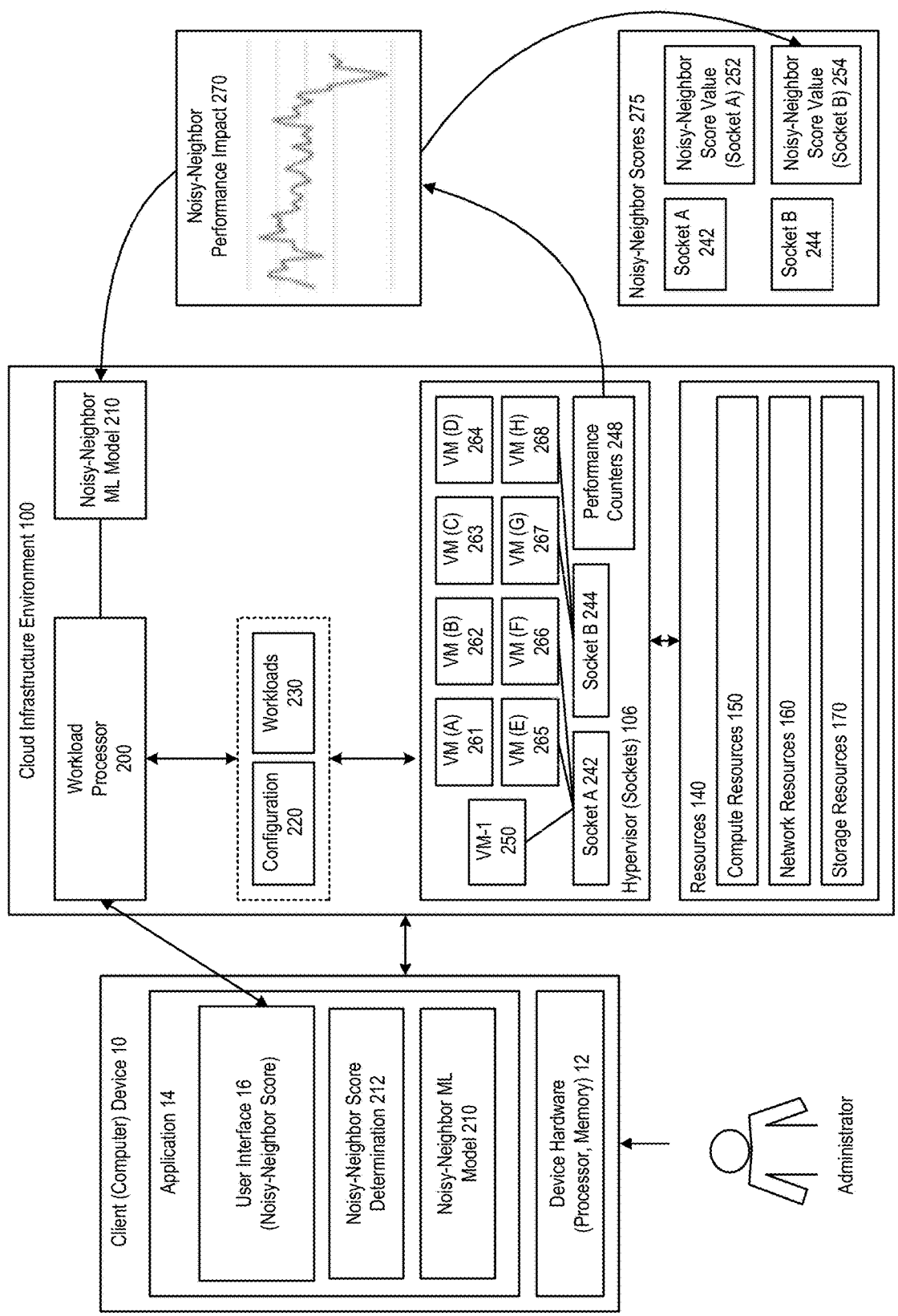
FIG. 7 further illustrates a system for estimation of performance impact upon a hypervisor socket provided within a cloud environment, in accordance with an embodiment.
Figure 8:
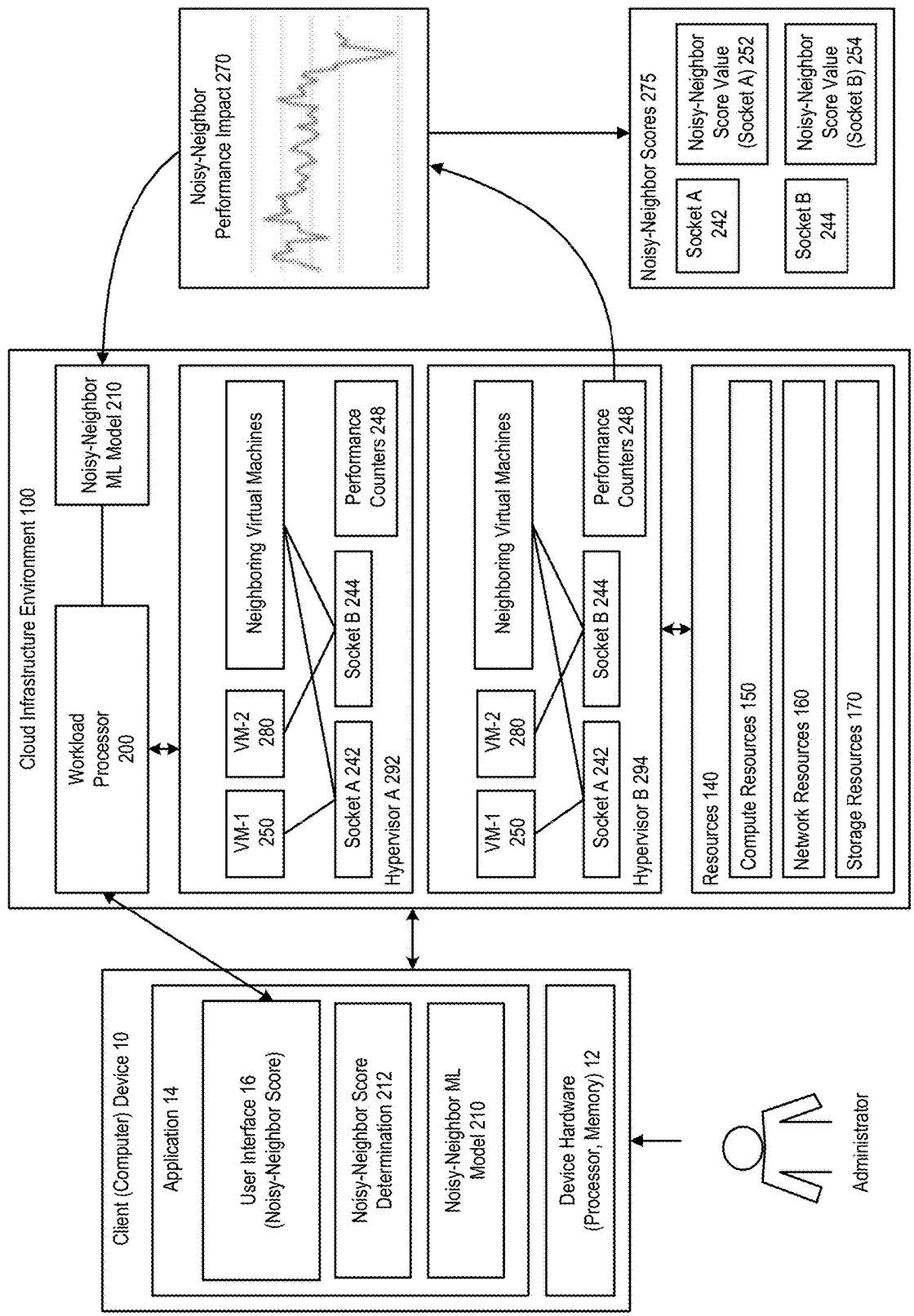
FIG. 8 further illustrates a system for estimation of performance impact upon a hypervisor socket provided within a cloud environment, in accordance with an embodiment.

FIGS. 7-8 further illustrate a system for estimation of performance impact upon a hypervisor socket provided within a cloud environment, in accordance with an embodiment.

In accordance with an embodiment, as illustrated in FIGS. 7-8, the process can be repeated for other types of hypervisor sockets, A 242, B 244, within the cloud environment.

Figure 9:
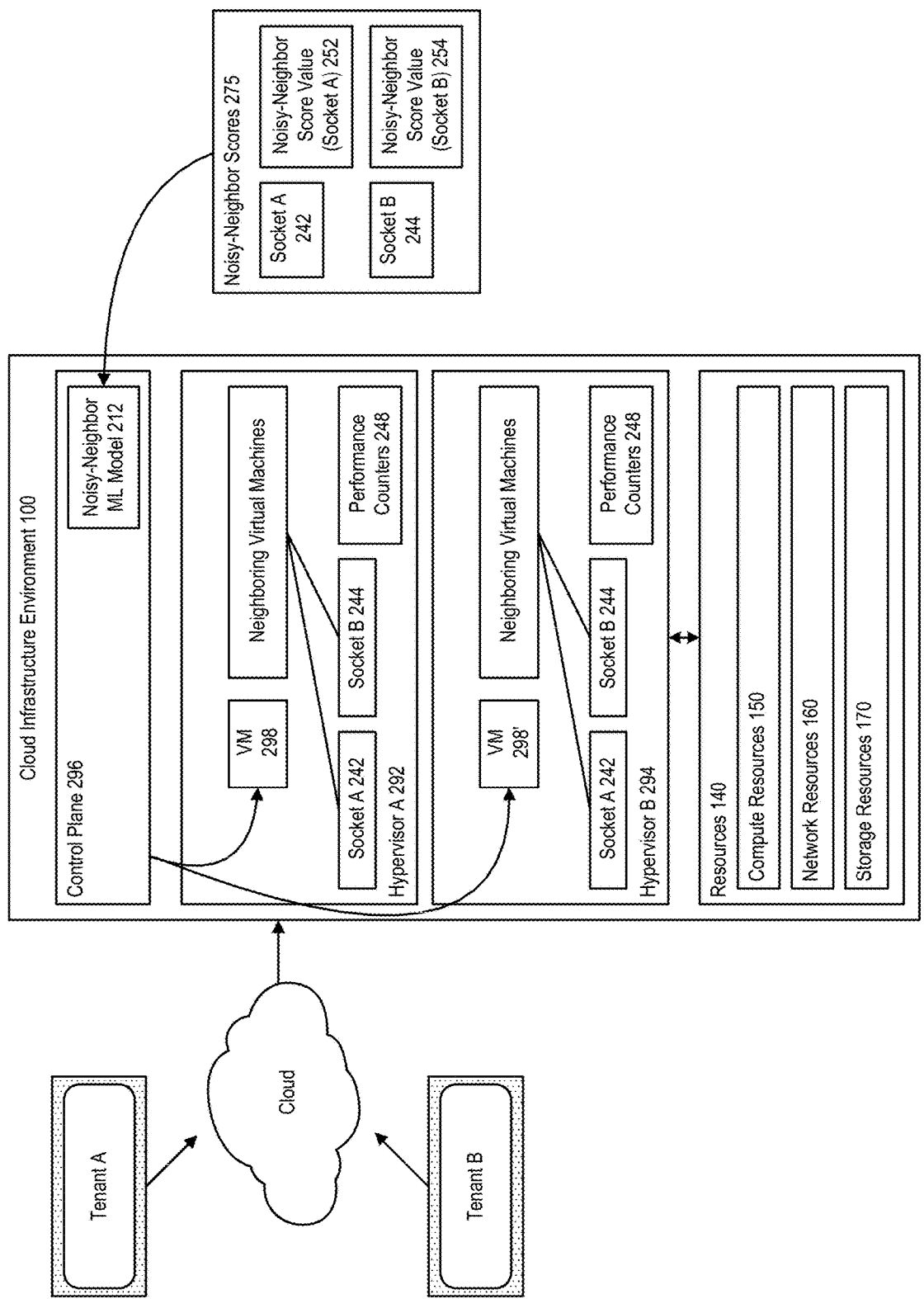
FIG. 9 illustrates an example use of the estimation of performance impact upon a hypervisor socket, to place virtual machines, in accordance with an embodiment.

FIG. 9 illustrates an example use of the estimation of performance impact upon a hypervisor socket, to place virtual machines, in accordance with an embodiment.

As described above, in accordance with an embodiment, as a result or output of the process or generating noisy-neighbor scores, each of a plurality of sockets (for example, sockets A and B) will be associated with their own individual noisy-neighbor scores. As illustrated in FIG. 9, in accordance with an embodiment, the noisy-neighbor score can then be used for various purposes, for example to determine the deployment or placement by a control plane 296 of virtual machines 298 within the cloud environment, to better facilitate sharing of resources or improve system performance for one or more tenants. The noisy-neighbor score can also be displayed or otherwise reported, for example for administrative or network management purposes.

In accordance with an embodiment, the noisy-neighbor score can be used in addition to existing hypervisor socket packing algorithms, to select a particular hypervisor while placing a virtual machine. This reflects the fact that the usage of compute resources on a hypervisor can be different from allocation, since a higher allocation (an amount of existing virtual machines on a hypervisor) does not necessarily confirm higher compute usage; in some instances a lower allocation can have much higher compute usage.

Example Implementation

By way of illustrative example, in accordance with an embodiment, a noisy-neighbor score for a socket of a host/dom0/Hypervisor can be provided as a predicted measure of performance drop that the virtual machines on it are experiencing at a point of time due to the presence of neighboring virtual machines on that socket of the host. The drop in performance can be calculated from the compute usage and the nature of compute usage on the host.

Figure 10:
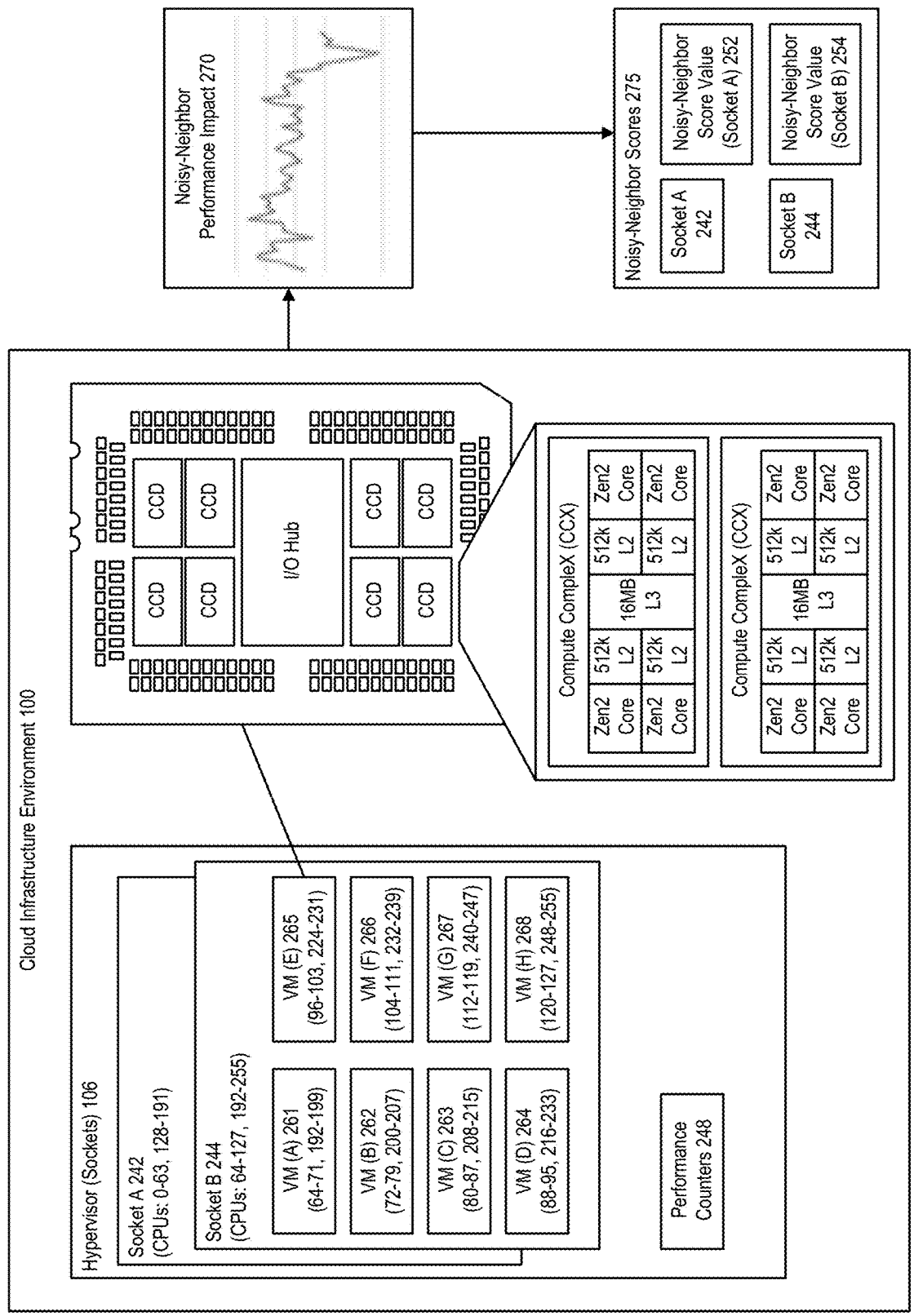
FIG. 10 illustrates an example cloud infrastructure environment which includes a processor architecture and hypervisor having sockets shared by multiple virtual machines, in accordance with an embodiment.

FIG. 10 illustrates an example cloud infrastructure environment which includes a processor architecture, and a hypervisor having sockets shared by multiple virtual machines, in accordance with an embodiment.

As illustrated in FIG. 10, in accordance with an embodiment, the approach can be used to estimate degradation due to the presence of noisy-neighbors based on machine learning techniques; and can be applied to different processor architectures, including for example an AMD processor architecture as illustrated and described herein, relying on specific hardware counters or other features supported by those architectures.

In accordance with an embodiment applicable to such architectures, an active core can be understood as one in which the Core Utilization % of that core/vcpu is greater than 1, as reported by individual vcpu counters. An active CCX refers to a group or array of four CPU cores and their CPU caches (L1, L2, L3). In such an environment, the performance degradation is dependent on noisy-neighbors sharing every socket. For example, when a 128 core AMD Rome host is considered, the hardware counters will be summarized socket wise.

In accordance with an embodiment, the approach can be generalized or applied to other types of processor architectures.

Figure 11:
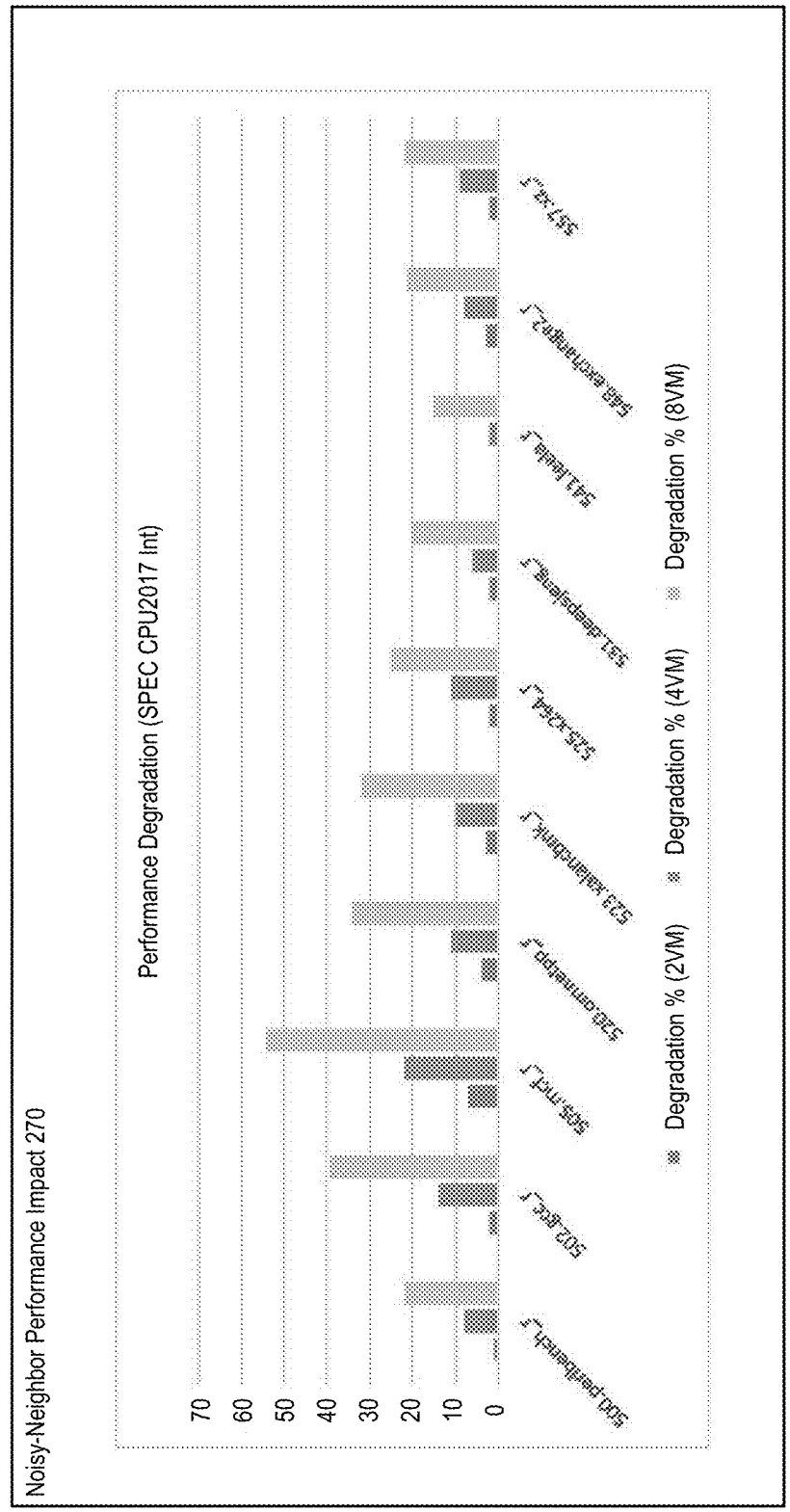
FIG. 11 illustrates an example factor in determining a noisy-neighbor performance impact, in accordance with an embodiment.
Figure 12:
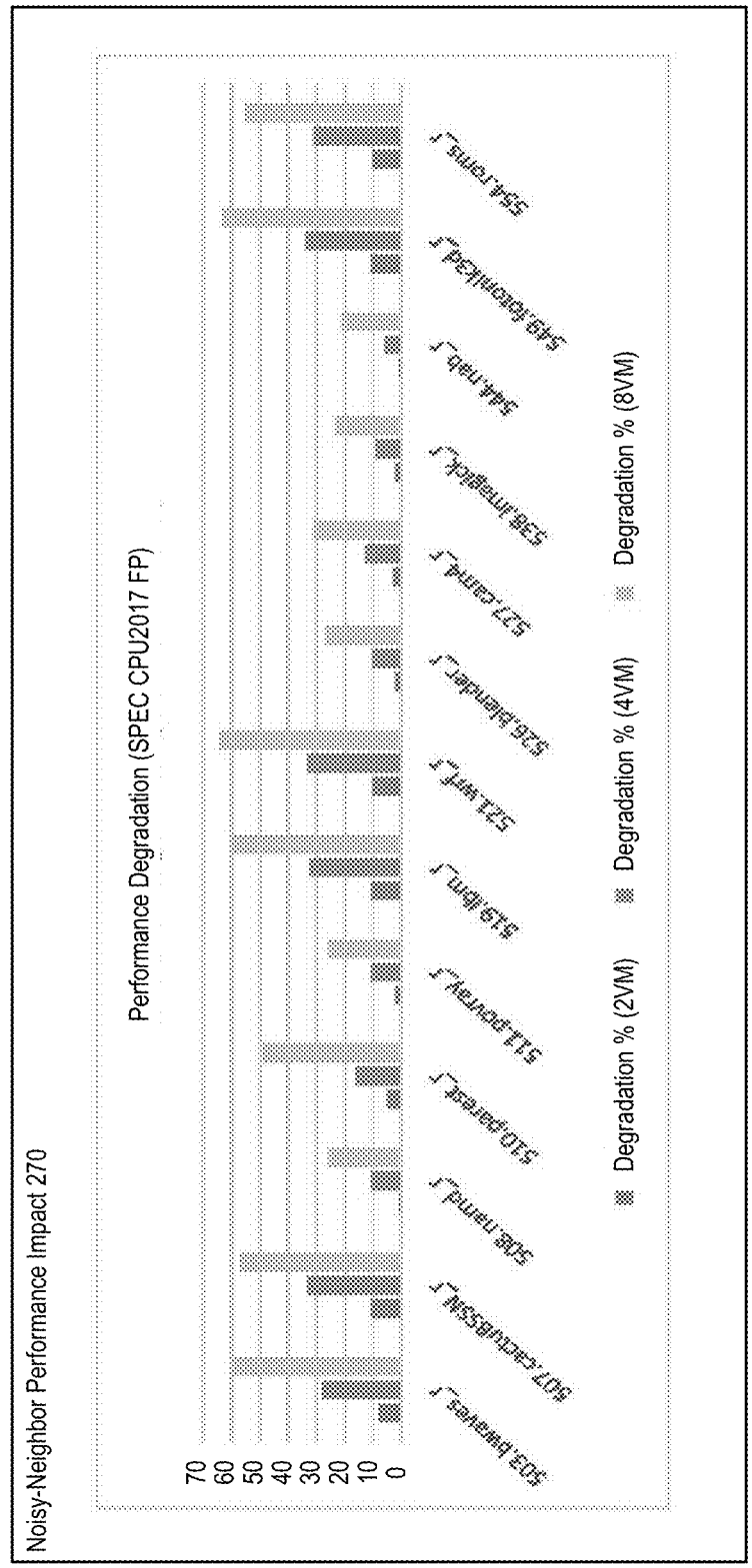
FIG. 12 illustrates an example factor in determining a noisy-neighbor performance impact, in accordance with an embodiment.
Figure 13:
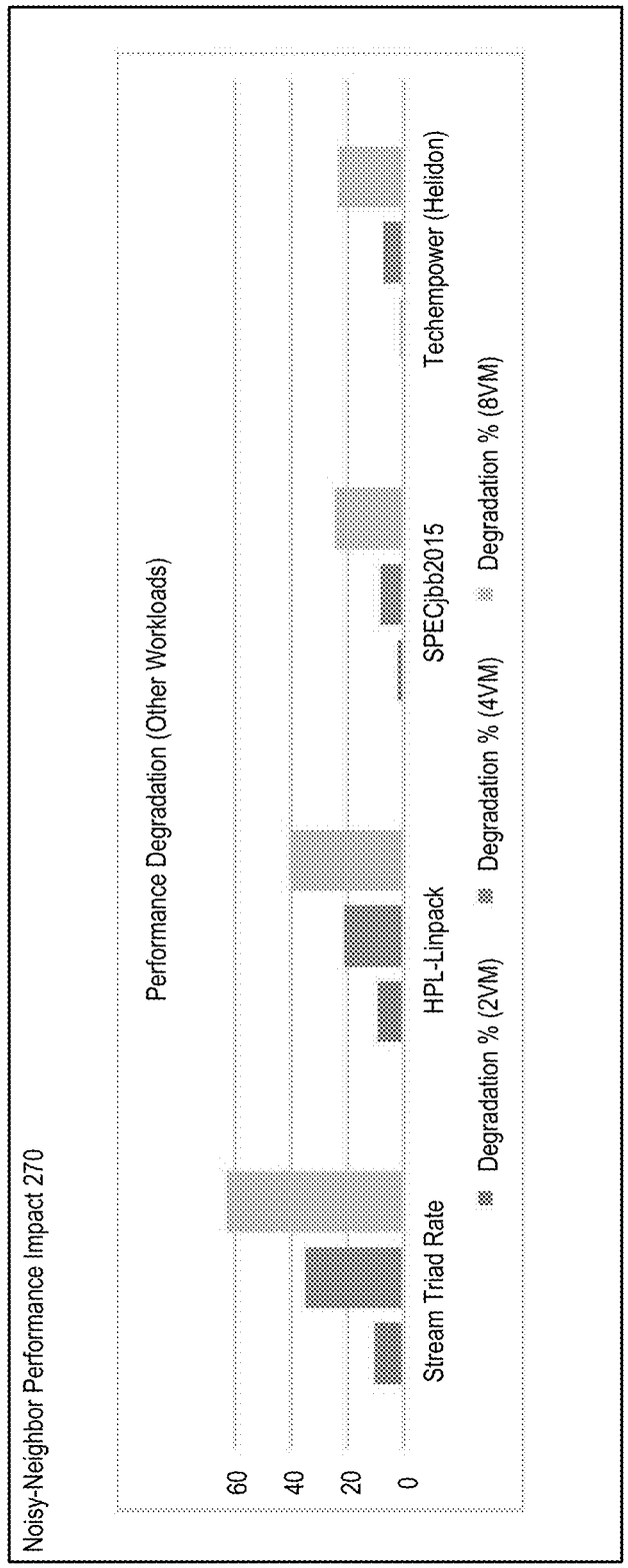
FIG. 13 illustrates an example factor in determining a noisy-neighbor performance impact, in accordance with an embodiment.

FIGS. 11-13 illustrate example factors in determining a noisy-neighbor performance impact, in accordance with an embodiment.

As illustrated in FIGS. 11-13, in accordance with an embodiment, examples of workloads that can be included for purposes of model training can include individual workloads of SPEC CPU 2017 (Integer (Int) and Floating Point (FP)), HPL-Linpack and/or Stream, which respectively stresses Compute, FPU (Floating Point Unit), and memory bandwidth. In accordance with various embodiments, other types of workloads such as PaaS workloads can be used.

In accordance with an embodiment, the workloads are executed in a controlled environment by (a) running the workloads with 1 VM for obtaining a baseline, and (b) running the workloads with 2, 4 and 8 VM neighbors which share hypervisor sockets. Through analysis of various available counters an appropriate set of counters can then be chosen to monitor, and subsequently by collecting data from such counters and monitoring performance degradation, a predictive model is built using machine learning techniques.

Example Workloads

In accordance with an embodiment, and for purposes of illustration, Table 1 illustrates various examples of workloads that can be run in order to determine a noisy-neighbor score. In accordance with other embodiments, other types of workloads, performance counters, and performance metrics can be used, to address particular computing environments, requirements, or use cases.

TABLE 1

10 Integer workloads of SPEC CPU2017
13 Floating Point workloads of SPEC CPU2017
HPL - Linpack (HPC)
Stream (Memory BW)
Workload Name WORKLOAD_NAME
Configuration NOVM_CONFIGURATION
ONE - Only one VM active on Hypervisor
TWO - Two VMs active on Hypervisor
FOUR - Four VMs active on Hypervisor
EIGHT - Eight VMs active on Hypervisor
Configuration CCX_CONFIGURATION (SHARED/NOT-SHARED)
Average "Utilization %"(Core Utilization) of
ARRAY_ACTIVE_CORES
Average "Effective Frequency" of ARRAY_ACTIVE_CORES
Average "L3 Hit %" of ARRAY_ACTIVE_CCXS
Average "L3 Hits" of ARRAY_ACTIVE_CCXS (check on model)
Average "L3 Miss Latency" in core cycles of ARRAY_ACTIVE_CCXS
Average "Memory BW" in GB/s of ARRAY_ACTIVE_CORES
Average "GFLOPS" of ARRAY_ACTIVE_CORES
Average "CPI" of ARRAY_ACTIVE_CORES In accordance with an embodiment, using the above workloads as an example, a machine learning model can be illustrated or presented as, for example:

my_features=['Eff freq',
  'L3 Hit %',
  'L3 Hits(pti)',
  'Avg L3 Miss latency in core cycles',
  'Memory BW-GB/s',
  'GFLOPS',
  'CPI']

NNModelMulti=tc.linear_regression.create
  (train_data,
  target='Percentage Drop',
  features=my_features)
NNModelMulti.summary( )

In accordance with an embodiment as illustrated above, the machine learning model can apply a linear regression process to a set of performance measurements (my_features) associated with the architecture and reported by various performance counters, such as, for example, the effective frequency of active cores, L3 hit percentage, L3 hits(pti), average L3 miss latency in core cycles, memory bandwidth of active cores, and average GFLOPS and cycles per instruction of active cores.

The system can be used to train the model with a set of training data, for purposes of determining percentage drop in performance; and then apply the model as-trained for purposes of determining the performance impact due to noisy-neighbors, using such information in placing a virtual machine within the computing environment, or other use cases and applications.

The machine learning model illustrated above is provided for purposes of illustration of a particular embodiment. In accordance with other embodiments, other types of machine learning models based on other types of workloads, performance counters, and performance metrics can be used, to address particular computing environments, requirements, or use cases.

In accordance with an embodiment, an example result of applying the above linear regression approach to generating a machine learning model for use by the system can be illustrated as, for example:

0Class: LinearRegression
Schema
Number of coefficients: 8
Number of examples: 175 #Number of Unique Data points from different workloads
Number of feature columns: 7
Number of unpacked features: 7
Hyperparameters
L1 penalty: 0.0
L2 penalty: 0.01
Training Summary
Solver: newton
Solver iterations: 1
Solver status: SUCCESS: Optimal solution found.
Training time (sec): 0.0085
Settings
Residual sum of squares: 7359.7374
Training RMSE: 6.485
Highest Positive Coefficients
(intercept): 57.7956
CPI: 0.9446
Memory BW -GB/s: 0.2143
L3 Hit %: 0.0532
Average L3 Miss latency in core cycles: 0.0488
Lowest Negative Coefficients
L3 Hits(pti): −0.0906
Eff frequency: −0.0268
GFLOPS: −0.0047

Example Result 1

Figure 14:
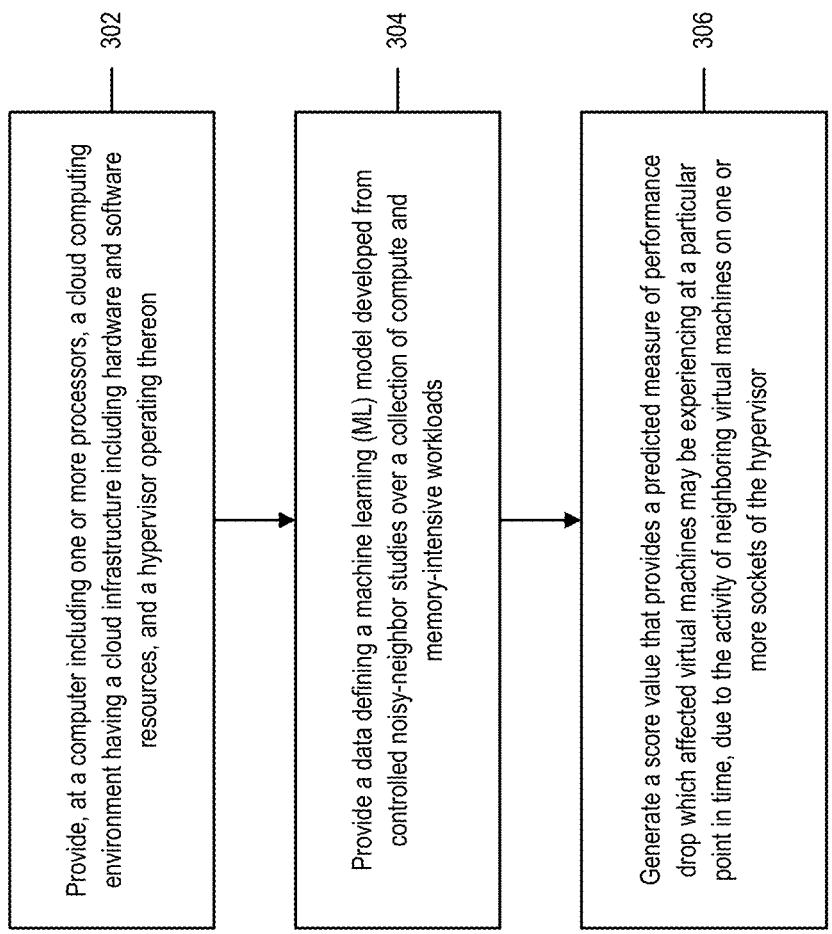
FIG. 14 illustrates a process for estimation of performance impact upon a hypervisor socket provided within a cloud environment, in accordance with an embodiment.

FIG. 14 illustrates a process for estimation of performance impact upon a hypervisor socket provided within a cloud environment, in accordance with an embodiment.

As illustrated in FIG. 14, in accordance with an embodiment, at step 302, at a computer including one or more processors, a cloud computing environment having a cloud infrastructure including hardware and software resources, and a hypervisor operating thereon is provided.

At step 304, the system provides a data defining a machine learning model developed from controlled noisy-neighbor studies over a collection of compute and memory-intensive workloads.

At step 306, the system generates a score value that provides a predicted measure of performance drop which affected virtual machines may experience at a particular point in time, due to activity of neighboring virtual machines on one or more sockets of the hypervisor.

In accordance with an embodiment, the predicted measure of performance drop or noisy-neighbor score can then be used for various purposes, for example to determine the deployment or placement of virtual machines within the cloud environment, to better facilitate sharing of resources or improve system performance for one or more tenants.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for use with a cloud or other computing environment, for estimation of performance impact upon a hypervisor socket provided within such environment, and use thereof, comprising:
a computer including one or more processors, and a cloud computing environment having hardware and software resources, and a hypervisor operating thereon, said cloud computing environment comprising a provisioning service that clients use to provision and manage compute instances that are launched to meet compute and application requirements;
wherein the system includes a data defining a machine learning model, said machine learning model generated by the system by:
determining a set of virtual machine configurations and workloads;
providing to a workload processor an indication of a particular virtual machine and hypervisor configuration for workload testing over a number of test runs;
executing the workloads over the test runs comprising one or multiple virtual machine neighbors having a same configuration and sharing a socket of the hypervisor; and
during each test run, collecting performance data from a set of performance counters associated with a measured drop in performance, which performance data is used to train the machine learning model indicative of a predicted performance degradation for virtual machines due to neighboring virtual machines;
wherein said machine learning model is adapted for use by the system to;
generate a score value that provides a predicted measure of performance drop that affected virtual machines may experience at a particular point in time, due to activity of neighboring virtual machines on one or more sockets of the hypervisor; and
based on the score value, determining a deployment or placement of virtual machines within the cloud environment to facilitate sharing of resources.

2. The system of claim 1, wherein the predicted measure of performance drop is automatically calculated by the system based on an amount and nature of compute usage on the hypervisor, and the data defining a machine learning model that is developed from controlled noisy-neighbor studies over a collection of compute and memory-intensive workloads.

3. The system of claim 2, wherein during each run of workloads, an analysis of counters is monitored, and the model used to generate a noisy-neighbor score for each of a plurality of hypervisor sockets, wherein the noisy-neighbor score provides a measure or otherwise determines a drop in performance that each of the virtual machines placed on the hypervisor socket will potentially experience, compared to when the virtual machine is the only occupant on the hypervisor socket.

4. The system of claim 1, wherein each of the plurality of hypervisor sockets are associated with their own individual noisy-neighbor scores.

5. The system of claim 4, wherein a noisy-neighbor score can be used in selecting a particular hypervisor while placing a virtual machine within the cloud or other computing environment.

6. The system of claim 1, wherein a noisy-neighbor score for a socket of a hypervisor is provided as a predicted measure of performance drop that virtual machines are experiencing at a point of time due to presence of neighboring virtual machines on that socket, wherein the drop in performance is calculated from the compute usage and the nature of compute usage on the host.

7. The system of claim 1, wherein workloads are executed in a controlled environment by running the workloads with one virtual machine for obtaining a baseline, and then running the workloads with multiples of virtual machine neighbors which share hypervisor sockets.

8. The system of claim 1, wherein noisy-neighbor performance impact is hardware socket specific, the system is adapted to generate the noisy-neighbor score for each of a plurality of hypervisor sockets, wherein the score provides a measure of drop in performance that each of the virtual machines placed on the hypervisor socket will potentially experience, compared to when the virtual machine is the only occupant on the hypervisor socket.

9. The system of claim 1, wherein hardware counters are used to assess usage profiles and noisy-neighbors, and determine the counters that drive the drop in performance.

10. The system of claim 1, wherein a noisy-neighbor score is used to determine the deployment or placement by a control plane of virtual machines within the cloud environment.

11. A method for use with a cloud or other computing environment, for estimation of performance impact upon a hypervisor socket provided within such environment, and use thereof, comprising:
  providing, at a computer system including one or more processors, a cloud computing environment having hardware and software resources, and a hypervisor operating thereon, said cloud computing environment comprising a provisioning service that clients use to provision and manage compute instances that are launched to meet compute and application requirements;
  providing a data defining a machine learning model, said machine learning model generated by:
    determining a set of virtual machine configurations and workloads;
    providing to a workload processor an indication of a particular virtual machine and hypervisor configuration for workload testing over a number of test runs;
    executing the workloads over the test runs comprising one or multiple virtual machine neighbors having a same configuration and sharing a socket of the hypervisor; and
    during each test run, collecting performance data from a set of performance counters associated with a measured drop in performance, which performance data is used to train the machine learning model indicative of a predicted performance degradation for virtual machines due to neighboring virtual machines;
  wherein said machine learning model is adapted for use by the system to:
    generate a score value that provides a predicted measure of performance drop that affected virtual machines may experience at a particular point in time, due to activity of neighboring virtual machines on one or more sockets of the hypervisor; and
    based on the score value, determining a deployment or placement of virtual machines within the cloud environment to facilitate sharing of resources.

12. The method of claim 11, wherein the predicted measure of performance drop is automatically calculated by the system based on an amount and nature of compute usage on the hypervisor, and the data defining a machine learning model that is developed from controlled noisy-neighbor studies over a collection of compute and memory-intensive workloads.

13. The method of claim 12, wherein during each run of workloads, an analysis of counters is monitored, and the model used to generate a noisy-neighbor score for each of a plurality of hypervisor sockets, wherein the noisy-neighbor score provides a measure or otherwise determines a drop in performance that each of the virtual machines placed on the hypervisor socket will potentially experience, compared to when the virtual machine is the only occupant on the hypervisor socket.

14. The method of claim 11, wherein each of the plurality of hypervisor sockets are associated with their own individual noisy-neighbor scores.

15. The method of claim 14, wherein a noisy-neighbor score can be used in selecting a particular hypervisor while placing a virtual machine within the cloud or other computing environment.

16. A non-transitory computer readable storage medium having instructions thereon, which when read and executed by a computer including one or more processors cause the computer to perform a method comprising:
  providing, at a computer system including one or more processors, a cloud computing environment having hardware and software resources, and a hypervisor operating thereon, said cloud computing environment comprising a provisioning service that clients use to provision and manage compute instances that are launched to meet compute and application requirements;
  providing a data defining a machine learning model, said machine learning model generated by:
    determining a set of virtual machine configurations and workloads;
    providing to a workload processor an indication of a particular virtual machine and hypervisor configuration for workload testing over a number of test runs;
    executing the workloads over the test runs comprising one or multiple virtual machine neighbors having a same configuration and sharing a socket of the hypervisor; and
    during each test run, collecting performance data from a set of performance counters associated with a measured drop in performance, which performance data is used to train the machine learning model indicative of a predicted performance degradation for virtual machines due to neighboring virtual machines;
  wherein said machine learning model is adapted for use by the system to:
    generate a score value that provides a predicted measure of performance drop that affected virtual machines may experience at a particular point in time, due to activity of neighboring virtual machines on one or more sockets of the hypervisor; and
    based on the score value, determining a deployment or placement of virtual machines within the cloud environment to facilitate sharing of resources.

17. The non-transitory computer readable storage medium of claim 16, wherein the predicted measure of performance drop is automatically calculated by the system based on an amount and nature of compute usage on the hypervisor, and the data defining a machine learning model that is developed from controlled noisy-neighbor studies over a collection of compute and memory-intensive workloads.

18. The non-transitory computer readable storage medium of claim 17, wherein during each run of workloads, an analysis of counters is monitored, and the model used to generate a noisy-neighbor score for each of a plurality of hypervisor sockets, wherein the noisy-neighbor score provides a measure or otherwise determines a drop in performance that each of the virtual machines placed on the hypervisor socket will potentially experience, compared to when the virtual machine is the only occupant on the hypervisor socket.

19. The non-transitory computer readable storage medium of claim 16, wherein each of the plurality of hypervisor sockets are associated with their own individual noisy-neighbor scores.

20. The non-transitory computer readable storage medium of claim 19, wherein a noisy-neighbor score can be used in selecting a particular hypervisor while placing a virtual machine within the cloud or other computing environment.

* * * * *

UNITED STATES PATENT AND TRADEMARK OFFICE
CERTIFICATE OF CORRECTION

PATENT NO. : 12,093,714 B2
APPLICATION NO. : 17/380750
DATED : September 17, 2024
INVENTOR(S) : Guchhait et al.

It is certified that error appears in the above-identified patent and that said Letters Patent is hereby corrected as shown below:

In the Claims

In Column 14, Line 19, in Claim 1, delete "to;" and insert -- to: --, therefor.

In Column 15, Line 43, in Claim 11, delete "to;" and insert -- to: --, therefor.

Signed and Sealed this
Twenty-first Day of January, 2025

Coke Morgan Stewart
*Acting Director of the United States Patent and Trademark Office*